(12) United States Patent
Castillo Redondo

(10) Patent No.: US 11,439,268 B2
(45) Date of Patent: Sep. 13, 2022

(54) PORTABLE BREWING DEVICE

(71) Applicant: Mauricio Castillo Redondo, San José (CR)

(72) Inventor: Mauricio Castillo Redondo, San José (CR)

( * ) Notice: Subject to any disclaimer, the term of this patent is extended or adjusted under 35 U.S.C. 154(b) by 676 days.

(21) Appl. No.: 16/344,312

(22) PCT Filed: Nov. 20, 2017

(86) PCT No.: PCT/IB2017/057264
§ 371 (c)(1),
(2) Date: Apr. 23, 2019

(87) PCT Pub. No.: WO2018/193295
PCT Pub. Date: Oct. 25, 2018

(65) Prior Publication Data
US 2019/0269273 A1    Sep. 5, 2019

(30) Foreign Application Priority Data

Apr. 21, 2017  (CR) .............................. 2017-0000161

(51) Int. Cl.
| | |
|---|---|
| *A47J 31/02* | (2006.01) |
| *A47G 19/16* | (2006.01) |
| *A47J 31/00* | (2006.01) |
| *A47J 31/06* | (2006.01) |
| *B65D 85/812* | (2006.01) |

(52) U.S. Cl.
CPC .............. *A47J 31/02* (2013.01); *A47G 19/16* (2013.01); *A47J 31/005* (2013.01); *A47J 31/0626* (2013.01); *A47J 31/0636* (2013.01); *B65D 85/812* (2013.01)

(58) Field of Classification Search
CPC ..... A47G 19/16; A47J 31/005; A47J 31/0626; A47J 31/0636; B65D 85/812
See application file for complete search history.

(56) References Cited

U.S. PATENT DOCUMENTS

2013/0224339 A1   8/2013  Chang
2016/0001969 A1*  1/2016  Miyawaki ........... A47J 31/0626
                                                 426/82

(Continued)

FOREIGN PATENT DOCUMENTS

| | | |
|---|---|---|
| CA | 849366 A | 8/1970 |
| EP | 2932873 A1 | 10/2015 |
| WO | 9836991 | 8/1998 |

*Primary Examiner* — Omar Flores Sanchez
(74) *Attorney, Agent, or Firm* — The Brickell IP Group, PLLC; Javier Sobrado

(57) ABSTRACT

A brewing device (100) may be used to brew coffee or other brewable substances such as tea. The brewing device may include a housing (110) and one or more handles (120) for attaching the housing to a beverage container, such as a mug. The handles (120) may be moved between a stored and deployed position. The housing (110) may be porous and include a plurality of perforations (112) on each side. There may be about 70 perforations, with an even number distributed on each side of the housing, and the perforations may have a diameter of about 2.33 mm so as to permit the flow of oils and other elements of coffee which might otherwise be filtered through the housing material.

20 Claims, 3 Drawing Sheets

(56) References Cited

U.S. PATENT DOCUMENTS

| | | | | |
|---|---|---|---|---|
| 2016/0157662 A1* | 6/2016 | Yang | ................... | A47J 31/0636 |
| | | | | 99/289 R |
| 2016/0318705 A1* | 11/2016 | Saitoh | ..................... | A47J 31/06 |
| 2017/0105569 A1* | 4/2017 | Chang | ................. | B65D 85/812 |

\* cited by examiner

PORTABLE BREWING DEVICE

CROSS REFERENCE TO RELATED APPLICATIONS

This application claims priority to Costa Rican Utility Model Application Request No. 2017-0000161 filed Apr. 21, 2017 entitled "Drip Bag for coffee with 70 perforations," the entire contents of which are incorporated herein by reference.

FIELD OF THE DISCLOSURE

This disclosure relates generally to brewing devices and, more particularly, to coffee filters and methods of making coffee.

BACKGROUND

Coffee is one of the most popular beverages in the world. Its natural composition has a broad variety of elements. A cup of coffee may have more than 1,000 different chemical substances including amino acids and other nitrogenous compounds, polysaccharides and other carbohydrates, besides triglycerides, linoleic acid, diterpenes (such as cafestol and kahweol), phenolic compounds (such as cholorogenic acids), volatile acids (such as a formic and acetic acides) and nonvolatile acids (such as lactic, tartaric, pyruvic, and citric), as well as other volatile substances. The volatile substances of coffee are responsible for the coffee's aroma. Nearly 800 volatile substances have been historically identified within any given cup of coffee, with an estimated 60 to 80 of those volatile substances principally contributing to the aroma and flavor of the coffee. Volatile components may include organic acids, aldehydes, ketones, esters, amines and mercapatans. Additional non volatile substances are known to exist in coffee which are incorporated into tiny crystals which dissolve when coming into contact with hot water, and thus leave waste and solids which need to be retained. Examples of non volatile substances include caffeine, trigonelline, chlorogenic acid, amino acids, carbohydrates and other minerals.

Coffee is brewed from roasted coffee beans. The coffee beans may be processed by grinding the beans into a powder like substance. The coarseness levels of ground coffee beans are generally considered to be coarse, medium, or fine. A person of ordinary skill in the art would generally understand how find of a grinding constitutes a coarse, medium, or fine level of grinding, and would further appreciate that unique coffee making techniques depending on the coarseness of the coffee. For instance, a fine coffee grind may be used for espresso or Turkish coffee; a medium grind coffee may be used for drip pots; and a coarse coffee may be used for press pots or cold brewing. Grinding nomenclature may sometimes include intermediary or extreme grinding levels, such as: extra coarse; medium-coarse; medium-fine; and extra fine. The instant disclosure will simply refer to various grinds as coarse, medium, or fine, and unless otherwise stated a person of ordinary skill in the art should understand that, as the terms are used in the instant application, a coarse grind may encompass extra coarse or medium coarse grinds, a medium grind may encompass medium coarse or medium fine grinds, and a fine grind may encompass medium fine or extra fine grinds.

Over the past several centuries, various techniques and devices have been developed to brew coffee. Most primitively, a cloth bag or sock may be utilized as two-level device containing an upper level and a lower level. The upper level may include an opening through which the cloth sock or bag is placed with coffee inside, and boiling water may be poured through this bag on the top level dripping the coffee to the a pot or container placed at the bottom level. The method can be inconvenient, however, since it is not portable and a cotton flavor is often present in the brewed coffee due to the bag. Soap and other similar orders can sometimes be infused into the coffee due from the washing of the cloth.

Another known device is a percolator. Percolators are economic and can brew multiple cups of coffee at once. Preparation can be difficult, however, since leaving the percolator on for too long a period can result in very strong and bitter coffee. Percolators also tend to be rather large on not very portable.

A French press is another known device originally developed in France in the $19^{th}$ century. Also known as a plunger pot, the French press often consists of a glass and stainless steel outer cylinder with another cylinder inside having fine perforations and joined by a central axis so that the disc can move up and down thereby functioning as a filter to stop the passing of coffee solids. The method for making coffee with a French press is one of immersion. Coffee is added to boiling water, usually about 20 grams of coffee per 250 mL of water. The beverage then sits for 4 to 5 minutes and then the disc is lowered to sift the ground coffee from the liquid coffee. While a French press is very easy to use and allows for larger quantity of coffee oils to pass through brewing, the brewed coffee must be consumed rather quickly otherwise it will turn sour if left inside the French press.

A further device is a conical drip device. Melita Bentz was believed to invent the first paper filter in the early twentieth century. Her device featured a hole at the base to make drip coffee infusions for one cup. Later, a model known as the Kalita® was developed in the mid-twentieth century resembling the earlier conical drip device but featuring three holes at its lower point. Another conical drip model is the Hario® V60 which was introduced around 2005. The model V60 allows for the infusion by dripping through a filter method, although it requires a bit more labor than other conical drip devices. Water is boiled as the conical filter is set in place, with filter on including spiral designs on its surface that meet in ribcage fashion and run at the end of the cone in a big hole. The filter is initially soaked in hot water, a process that allows the rinsing of the filter and preheating of the cup, and then about 30 to 40 grams of coffee is placed in the topi conical part of the filter as water having a temperature of about 90 degree Celsius is slowly poured over coffee in clockwise rotating movements. The total pouring time is usually three to four minutes long. Each conical drip method requires a non-portable device as well as requiring special coffee and filters suitable for use with these devices. Consequentially, conical drip devices are generally not economical or easy to use.

Chemex® is another known coffee pot originally designed in the mid-twentieth century. It is made of glass and in the shape of an hourglass with a wooden protector around the neck region. This device is used by folding or rolling a paper filter over the top portion, adding ground coffee, and adding boiling water to allow the coffee to infuse the water through gravity and dripping the coffee into the bottom portion. This device requires a special, thick paper filter that hinders the passing of the coffee's essential oils. It is also not portable.

Siphon coffee makers, sometimes referred to as a vacuum coffee brewer, is another known device. These were invented in the nineteenth century and typically include a glass chamber, although metal or plastic materials have been used. The filter used can be a glass rod or a screen made of metal, cloth, paper or nylon. A U-shaped tube is utilized which allows for the liquid to flow upward, over the surface of the deposit without need for a pump so that it later flows down through the tube and into a recipient vessel. Siphons function to heat the water until it expands and is forced upwards into the tube.

Today, a typical coffee maker is used by an automatic drip method through a cloth or metal filter inside of a funnel placed on top of a glass or ceramic container. Water is poured in a separate chamber, boiled, and channeled to the funnel. Finely ground is typically used as well as special filters. The procedure to make the coffee is to place the coffee filter in the machine, add about 30 grams of coffee for every 473 mL of water to be used into the filter, pour enough water into the separate chamber for the number of desired cups and then press an "on" button to begin the boiling and channeling. This device is not very portable because of its size and requirement for special filters.

An AeroPress® is another known coffee making device. It is structured with two plastic cylinders that work jointly. To prepare coffee with this device, previously heated water is poured over ground coffee, stirred for a few seconds, and then a plunger must be pressed down to filter the coffee with air pressure. Timing, amount of coffee, and temperature are variable by individual taste, however professional baristas recommend to use between 50 to 70 grams of coffee per liter, process the coffee between 30 to 60 seconds, and use water with a temperature between 85 to 95 degrees Celsius.

Other known types of coffee making devices include Espresso machines and, more recently, pod machines which makes single cups of coffee from individual pods of ground coffee.

BRIEF SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later.

In one embodiment of the disclosure, a brewing device may include a housing having two opposed sides and an interior area dimensioned to be capable of holding a brewable substance, the housing substantially composed of a porous material. The brewing device may also include a handle provided on one of the two opposed sides of the housing, and the handle may be capable of being attached to a beverage container so as to fix the housing at a position within the beverage container. The brewing device may also include a plurality of perforations provided on the housing.

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents.

Other advantages and novel features will become apparent from the following description when considered in conjunction with the drawings.

DETAILED DESCRIPTION

Figure 1:
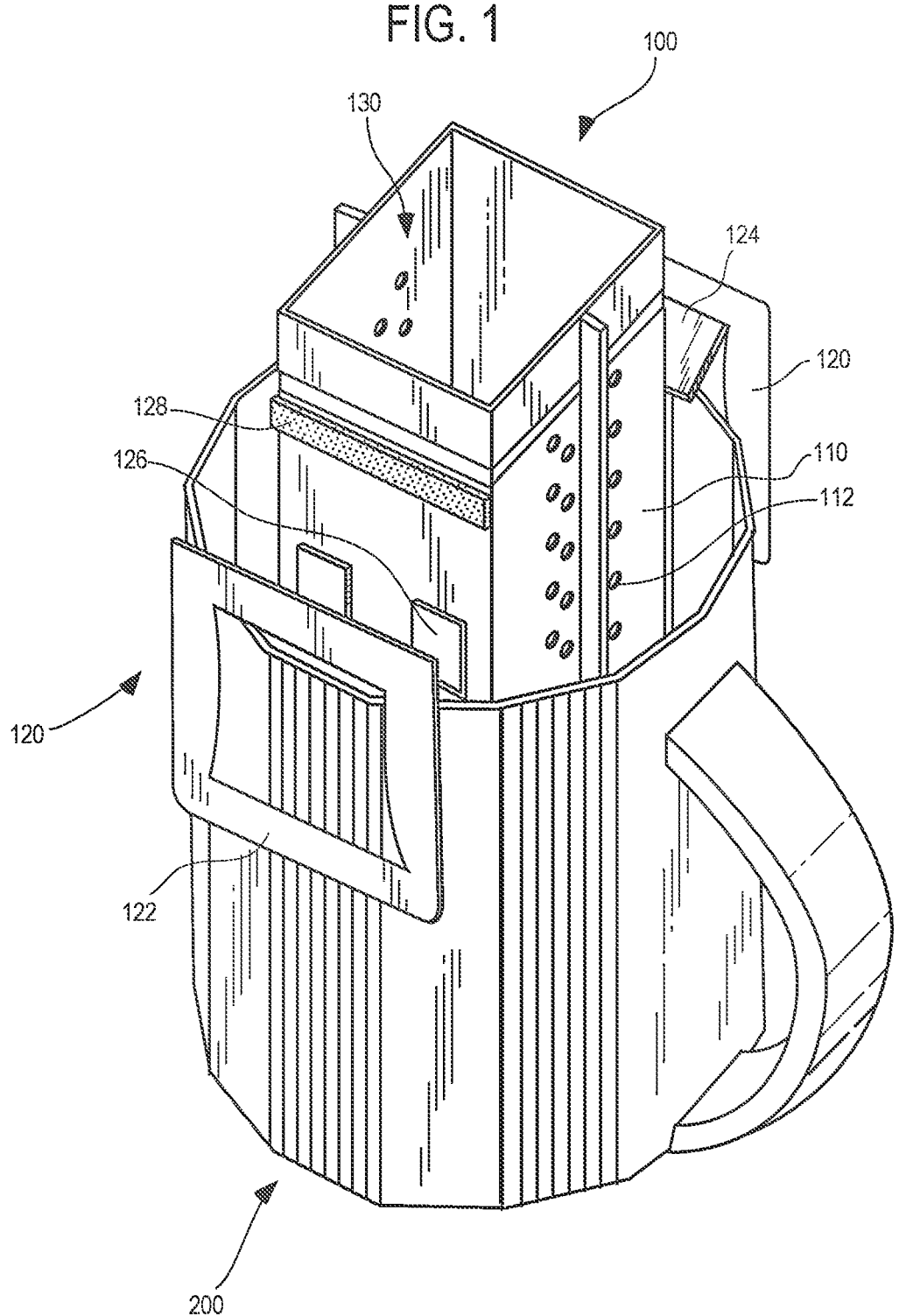
FIG. 1 illustrates a top perspective view of an embodiment of a brewing device mounted in a beverage container.

The following detailed description and the appended drawings describe and illustrate some embodiments of the disclosure for the purpose of enabling one of ordinary skill in the relevant art to make and use these embodiments. As such, the detailed description and illustration of these embodiments are purely illustrative in nature and are in no way intended to limit the scope of the disclosure in any manner. It should also be understood that the drawings are not necessarily to scale and in certain instances details may have been omitted, which are not necessary for an understanding of the embodiments, such as details of fabrication and assembly. In the accompanying drawings, like numerals represent like components.

In one embodiment of the disclosure, a brewing device may include a housing having two opposed sides and an interior area dimensioned to be capable of holding a brewable substance, the housing substantially composed of a porous material. The brewing device may also include a handle provided on one of the two opposed sides of the housing, and the handle may be capable of being attached to a beverage container so as to fix the housing at a position within the beverage container. The brewing device may also include a plurality of perforations provided on the housing.

In further embodiments, each perforation may have a diameter of about 2.33 mm. The plurality of perforations may comprise between about 30 perforations and about 80 perforations. The plurality of perforations may include about 70 perforations. The plurality of perforations may include substantially the same number of perforations on each of the at least two sides. The handle may include a wing connected to one of the two opposed sides of the housing by an arm, and the wing and arm may be capable of being attached over a lip of the beverage container. The brewing device may include a second handle including a second wing connected to the other of the two opposed sides of the housing by a second arm, and the second wing and second arm are capable of being attached over the lip of the beverage container. The brewing device may include a plurality of connecting strips provided on the same one of the two opposed sides of the housing as the handle, and the handle may be movable between a stored position, with the wing positioned proximate to the housing and connectable with the connecting strips, and a deployed positioned, with the wing positioned at a distance from the housing and capable of being attached to the beverage container. The perforations may be arranged in rows around the connecting strips. The brewing device may further include a second handle provided on the other of the two opposed sides of the housing, the handle and second handle movable between a stowed position proximate to the housing and a deployed position at a distance from the housing, the handle and second handle capable of being attached to an upper rim of the beverage container in the deployed position. The brewing device may further include a second handle provided on the other of the two opposed sides of the housing, the handle and second handle movable between a stowed position proximate to the housing and a deployed position at a distance from the housing, the handle and second handle capable of being attached to an upper rim of the beverage container in the deployed position, and the plurality of perforations arranged around the handle and second handle in the stowed position. The perforations may be arranged in two rows collectively forming a "U" shape. The perforations may be spaced apart on a left side of the "U" shape about 4.5 mm from center to center, on a right side of "U" shape about 9.5 mm from center to center, and on a bottom side of the "U" shape about 9.5 mm from center to center. The brewable substance may be coffee having a medium grind. The porous material may be paper.

In another embodiment of the disclosure, a method for brewing a brewable substance may include providing an embodiment of a brewable device as described herein containing the brewable substance, inserting the brewable device into a beverage container, fixing the brewable device at a position within the beverage container, and applying hot water to the brewable substance. The hot water may be applied by pouring it over the fixed brewable device. The hot water may be applied by first filling the beverage container with hot water to a height sufficient to submerge at least a portion of the brewable device including each perforation.

Figure 2:
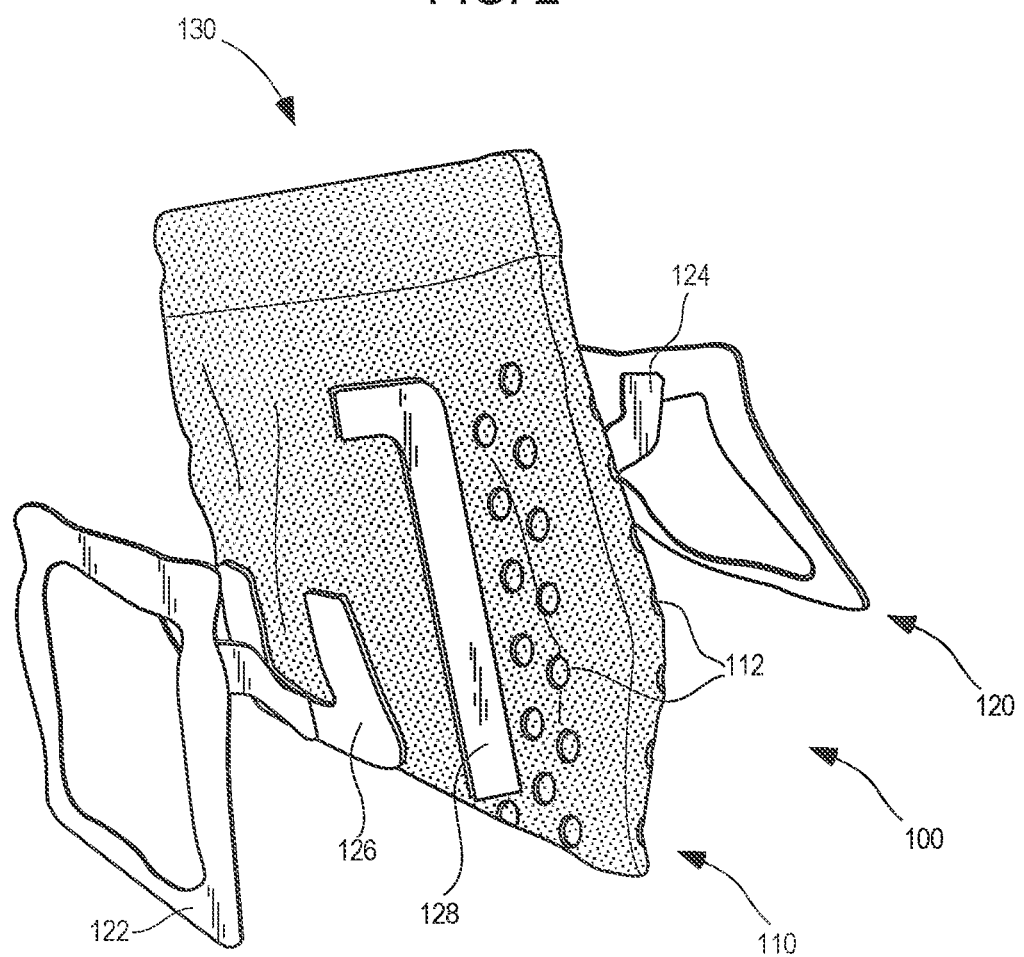
FIG. 2 illustrates a top perspective view of an embodiment of a brewing device before application of perforations.

With reference now to FIGS. 1 and 2, a brewing device 100 may be portable and mountable within, or capable of being attached to, a beverage container 200. The illustrated beverage container 200 is a common coffee mug, although other containers suitable for holding a beverage and having a top opening are contemplated within the disclosure. The brewing device 100 may include a housing 110 dimensioned to hold ground coffee or another brewable material within, and one or more handles or grips 120 to secure housing 110 to beverage container 200. Tea or other brewable materials are also contemplated as being used with brewing device 100. Housing 110 may be constructed from a porous material so as to permit fluid to pass from the interior of to the exterior of housing 110. Additionally, a plurality of perforations 112 may be provided so as to further facilitate the passage of coffee components out of housing 110 that might otherwise be caught in, or filtered by, the porous material of housing 110.

Brewing device 100 may include one handle 120 attached to, or provided on, a side of housing 110, or as illustrated device 100 may include a plurality of handles 120 with each handle provided on, or attached to, various sides of housing 110. Each handle 120 may include a wing 122, an arm 124, and an elbow 126. Wing 122 may be dimensioned to fit over an exterior surface of beverage container 200. In the illustrated embodiments, wing 122 is dimensioned in a square shape having four adjoined sides with arm 124 attached proximate to the top side. Arm 124 connects wing 122 with housing 110, which may be at an elbow 126 attached to housing 110. Elbow 126 may comprise a plurality of sides, with arm 124 attached to a bottom side of elbow 126. As shown in FIG. 1, for instance, a top lip of beverage container 200 may be situated between wing 122 and arm 124. In both illustrated embodiments, handles 120 are illustrated in a deployed position so as to permit attachment to beverage container 200. Handles may also be provided in a stored position, and one or more connection strips 128 may be provided to facilitate adhesion of wing 122 to the side of housing 120. In this regard, connection strips 128 may be positioned to correspond with one or more sides of wings 122. Elbow 126 may be positioned between connection strips 128 as well as between the top and lateral sides of wing 122 in its stored position, while the bottom side of wing 122 and the bottom side of elbow 126 may be substantially aligned in a stored position. Adhesive may be provided on one or more sides of wings 122, on connections strips 128, or both. Other known or to be developed adhesive methods are contemplated within the disclosure, such as a hook and loop fastener. Such adhesive methods and materials may avoid utilization of chemical components that would alter the composition, and consequentially the flavor or aroma, of the coffee during an infusion process described in accordance with this disclosure.

Housing 110 may also include a sealable opening 130. In some embodiments, opening 130 may be sealed with coffee, tea, or another brewable substance stored within while in other embodiments opening 130 may be unsealed and the brewable substance selected and placed within housing 110 through opening 130. Water may also be poured into opening 130 in accordance with infusion processes described herein.

Housing 110 may be composed of a porous material, such as paper, and further may include a plurality of perforations 112 provided on one or more sides of housing 110. Each side may have a dimension of about 90 mm in height, defined as the distance between the edge of opening 130 and a base edge of housing 110, and about 70 mm in width, defined as the distance between lateral edges of housing 110. These dimensions may permit housing 110 to be portable and sufficiently dimensioned to fit within a standard coffee mug, as shown for instance in FIG. 1. Perforations 112 may each have a diameter of about 2.33 mm. About 35 perforations may be provided on opposing sides of housing 110 for a total of about 70 perforations.

An infusion or brewing process may be conducted utilizing device 10 in order to brew coffee, tea, or another brewable component through infusion with water. An infusion by immersion may occur where water is in continuous contact with the brewable substance stored in housing 110. In this method, water may be placed in beverage container 200 and housing 110 may be submerged into container 200. An infusion by dripping may occur where water flows over the brewable substance and drips into container 200. In this method, water may be poured over a brewable substance placed in housing 110, which then drips into container 200.

Testing was conducted to determine an optimal number of perforations 112 as well as an optimal size of each perforation 112 for brewing coffee. Testing was conducted to determine improvements in coffee flavor, color, aroma, and time of infusion required as a result of the brewing process. Initially, several sized needles were tested for generating perforations 112, but a needle size of about 2.33 mm was selected due to the type of fiber comprising paper filter housing 110. Smaller perforations would practically close while larger perforations would permit the unwanted passing of coffee solids. Testing was then conducted to determine an optimal number of perforations 112. 10 total perforations were initially tested, with 5 on opposing sides, but the results showed no improvement and the housing paper was saturated similarly to no perforations existing. 20 total perforations were then tested, with 10 on opposing sides, and results again showed no improvement and the housing paper was similarly saturated. 30 total perforations were then tested, 15 on each side, and a slight improvement was shown in the passing of the oils as well as an improvement in infusion time, however the housing paper remained similarly saturated. 40 total perforations were then tested, 20 on each side, with results showing a reduction of housing paper saturation and values of flavor increased, although color remained unimproved and there was no appreciable improvement of infusion time from testing with 30 total perforations. 50 total perforations, 25 on each side, were tested and improvement of all values to the coffee were demonstrated. 60 total perforations, 30 on each side, were tested and values to the coffee further improved from the testing of 60 total perforations. 70 total perforations, with 35 on each side, were then tested with the best results achieved of any testing. Specifically, testing of 70 total perforations demonstrated: the best outflow of coffee oils and their beneficial properties; best coffee flavor because the time of contact of the coffee is sufficient to allow the release of the oils, obtain the highest consistency and strength of the flavor, and accordingly contribute to a high body to the final flavor with good intensity; the best aroma of the coffee due to higher intensity; the best consistency to the coffee due to the freer flowing oils; and best performance in other qualitative data, such as a reduction of filtering time about 14 seconds, with no noticeable problem or hindrance. Additional perforations were tested, which showed improved performance from no or few perforations, but not as optimal of a performance as 70 perforations. 80 total perforations, with 40 on each side, were tested with good time of extraction performance, but the contact with the water was too quick to achieve optimal infusion thereby weakening the flavor and color compared to the 70 perforation test. 78 perforations were tested, with 39 on each side, with virtually the same performance as 80 perforations. 72 perforations were tested, with 36 on each side, with similar performance to the 70 perforations however the arrangement of perforations caused some clustering of perforations. Accordingly, between about 30 perforations to about 80 perforations showed improved performance, with substantial improvement occurring with about 50 to about 60 perforations, and optimal improvement achieved with about 70 perforations. With respect to the coffee tested, a fine, medium, and coarse grind were tested with the medium grind performing the best for allowing optimal extraction of the coffee's properties while not allowing solids to pass as was possible with the fine coffee grind.

Figure 3:
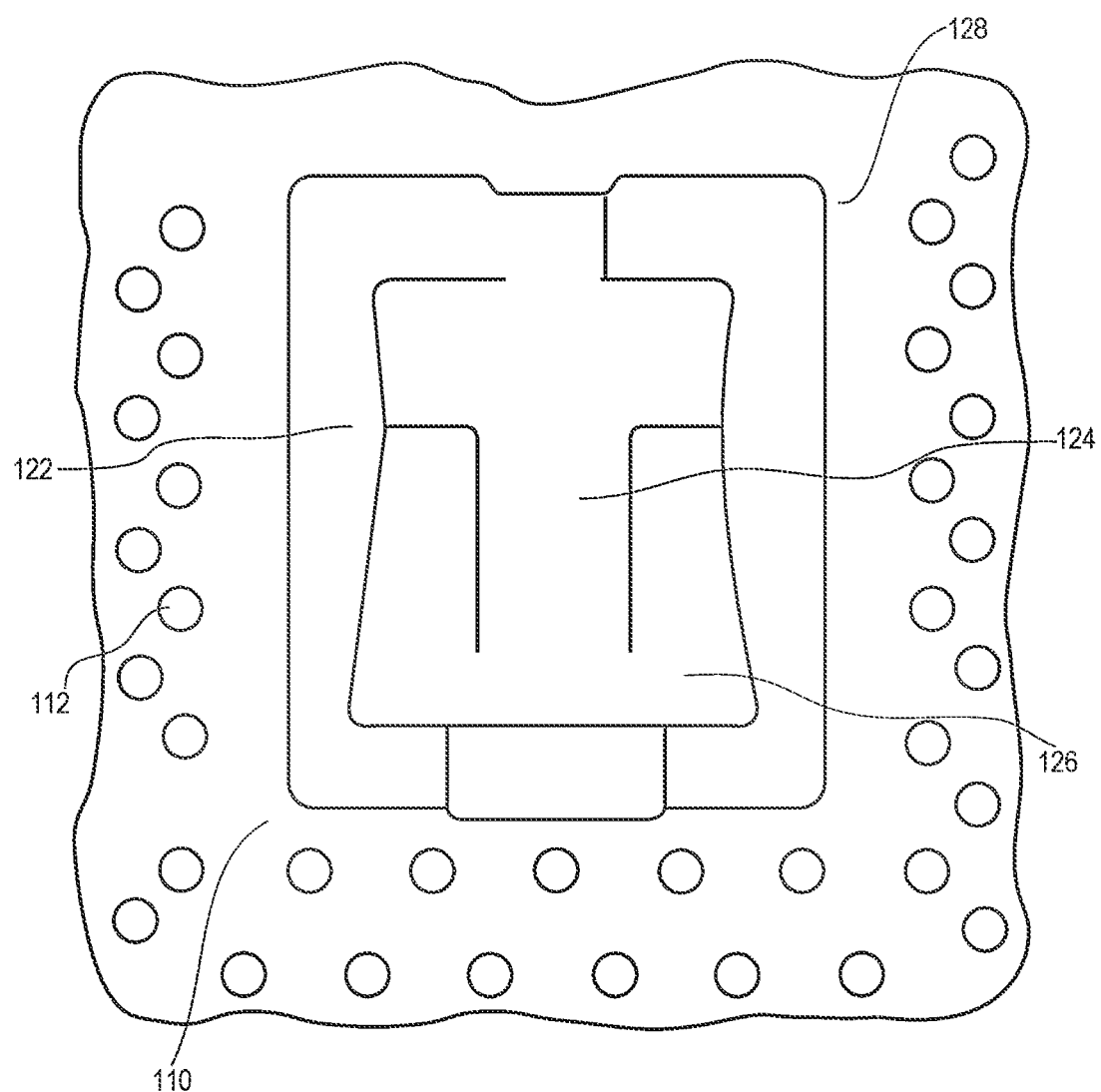
FIG. 3 illustrates a side view of a housing of an embodiment of a brewing device.

With reference now to FIG. 3, in an embodiment of housing 110 featuring 70 perforations 112, 35 may be placed on a side of housing 110 surrounding a portion of connection strips 128. Perforations 112 may be placed around connection strips 128 so as to avoid flow interference due to the positioning of the strips 128 or the components of handle 120 in either the deployed or stored position. Two rows of perforations 112 may be each placed around the left, right, and bottom sides of connection strips 128. As shown in the illustrated embodiment: the perforations 112 proximate to the left side may include 9 evenly spaced perforations 112; the perforations 112 proximate to the right side may include 11 evenly spaced perforations 112; the perforations proximate to the bottom side may include 11 evenly spaced perforations 112; and an additional 2 perforations may be provided in the bottom left corner as well an additional 2 perforations may be provided in the bottom right corner. In one embodiment of housing 110 having a height dimension of about 90 mm and a width dimension of about 70 mm, perforations 112 may be spaced at the following dimensions: left side perforations 112 spaced about 4.5 mm from center to center; right side perforation spaced about 9.5 mm from center to center; the bottom side perforations spaced about 9.5 mm from center to center; and the corner perforations spaced about 4 mm from each other while each corner perforation closest to the strips 128 may be aligned with the row of side and bottom perforations closest to strips 128. The spacing dimensions may adjusted +/−0.5 mm while still obtaining optimal results, and +/−1.5 mm while still obtaining improved results. This dimensional arrangement of perforations may avoid clustering to provide evenly distributed flow of coffee out of housing 110.

The descriptions set forth above are meant to be illustrative and not limiting. Various modifications of the embodiments, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the embodiments in many other ways, using equivalents and alternatives that do not depart from the scope of the disclosure. Moreover, unless indicated to the contrary in the preceding description, none of the components described in the implementations are essential to the embodiments disclosed. It is thus intended that the embodiments be considered as illustrative, with a true scope and spirit of the disclosure being indicated by the following claims.

What is claimed:

1. A brewing device comprising:
    a housing having two opposed sides and an interior area dimensioned to be capable of holding a brewable substance, the housing substantially composed of a porous material;
    a handle provided on one of the two opposed sides of the housing, the handle capable of being attached to a beverage container so as to fix the housing at a position within the beverage container; and
    a plurality of perforations provided on the housing;
    wherein the handle includes a wing connected to one of the two opposed sides of the housing by an arm, and the wing and arm are capable of being attached over a lip of the beverage container;
    further comprising a plurality of connecting strips provided on the same one of the two opposed sides of the housing as the handle, and
    wherein the handle is movable between a stored position, with the wing positioned proximate to the housing and connectable with the connecting strips, and a deployed positioned, with the wing positioned at a distance from the housing and capable of being attached to the beverage container.

2. The brewing device of claim 1, wherein each perforation has a diameter of about 2.33 mm.

3. The brewing device of claim 1 wherein the plurality of perforations comprise between about 30 perforations and about 80 perforations.

4. The brewing device of claim 3 wherein the plurality of perforations include substantially the same number of perforations on each of the at least two sides.

5. The brewing device of claim 1 wherein the plurality of perforations include about 70 perforations.

6. The brewing device of claim 5, wherein the plurality of perforations include substantially the same number of perforations on each of the at least two sides.

7. The brewing device of claim 1 further comprising a second handle including a second wing connected to the other of the two opposed sides of the housing by a second arm, and the second wing and second arm are capable of being attached over the lip of the beverage container.

8. The brewing device of claim 1, wherein the perforations are arranged in rows around the connecting strips.

9. The brewing device of claim 8, wherein the perforations are arranged in two rows collectively forming a "U" shape.

10. The brewing device of claim 1 wherein the plurality of perforations includes about 70 perforations with substantially the same number of perforations provided on each of the at least two sides, and each perforation has a diameter of about 2.33 mm.

11. The brewing device of claim 10 wherein the brewing device further comprises a second handle provided on the other of the two opposed sides of the housing, the handle and second handle movable between a stowed position proximate to the housing and a deployed position at a distance from the housing, the handle and second handle capable of being attached to an upper rim of the beverage container in the deployed position, and the plurality of perforations arranged around the handle and second handle in the stowed position.

12. The brewing device of claim 10 wherein the perforations are arranged in two rows collectively forming a "U" shape, and the perforations are spaced apart on a left side of the "U" shape about 4.5 mm from center to center, on a right side of the "U" shape about 9.5 mm from center to center, and on a bottom side of the "U" shape about 9.5 mm from center to center.

13. The brewing device of claim 10 wherein the brewable substance is coffee having a medium grind.

14. A brewing device comprising:
a housing having two opposed sides and an interior area dimensioned to be capable of holding a brewable substance, the housing substantially composed of a porous material;
a handle provided on one of the two opposed sides of the housing, the handle capable of being attached to a beverage container so as to fix the housing at a position within the beverage container; and
a plurality of perforations provided on the housing;
wherein the plurality of perforations includes about 70 perforations with substantially the same number of perforations provided on each of the at least two sides, and each perforation has a diameter of about 2.33 mm; and
wherein the perforations are arranged in two rows collectively forming a "U" shape, and the perforations are spaced apart on a left side of the "U" shape about 4.5 mm from center to center, on a right side of the "U" shape about 9.5 mm from center to center, and on a bottom side of the "U" shape about 9.5 mm from center to center.

15. A brewing device comprising:
a housing having two opposed sides and an interior area dimensioned to be capable of holding a brewable substance, the housing substantially composed of a porous material;
a handle provided on one of the two opposed sides of the housing, the handle capable of being attached to a beverage container so as to fix the housing at a position within the beverage container; and
a plurality of perforations provided on the housing;
wherein the perforations are arranged to collectively form a "U" shape.

16. The brewing device of claim 15 wherein the plurality of perforations includes about 70 perforations with substantially the same number of perforations provided on each of the at least two sides.

17. The brewing device of claim 15 wherein each perforation has a diameter of about 2.33 mm.

18. The brewing device of claim 15 wherein the perforations that form the "U" shape are arranged further in two rows.

19. The brewing device of claim 15 further comprising a plurality of connecting strips provided on the same one of the two opposed sides of the housing as the handle, wherein the perforations are arranged in rows around the connecting strips.

20. The brewing device of claim 19, wherein the handle includes a wing, and is movable between a stored position, with the wing positioned proximate to the housing and connectable with the connecting strips, and a deployed positioned, with the wing positioned at a distance from the housing and capable of being attached to the beverage container.

* * * * *